Oct. 30, 1962  M. F. PETERS  3,061,039
FLUID LINE SOUND-ABSORBING STRUCTURES
Filed Nov. 14, 1957  9 Sheets-Sheet 1

INVENTOR.
MELLVILLE F. PETERS
BY Albert F. Krosman
ATTORNEY

INVENTOR.
MELVILLE F. PETERS
BY Albert F. Kronman
ATTORNEY

INVENTOR.
MELVILLE F. PETERS
BY
ATTORNEY

Oct. 30, 1962   M. F. PETERS   3,061,039
FLUID LINE SOUND-ABSORBING STRUCTURES
Filed Nov. 14, 1957   9 Sheets-Sheet 4

INVENTOR.
MELVILLE F. PETERS
BY *Albert F. Kronman*
ATTORNEY

INVENTOR.
MELVILLE F. PETERS
BY Albert F. Krouman
ATTORNEY

Oct. 30, 1962     M. F. PETERS     3,061,039
FLUID LINE SOUND-ABSORBING STRUCTURES
Filed Nov. 14, 1957     9 Sheets-Sheet 6

INVENTOR.
MELVILLE F. PETERS
BY
ATTORNEY

Oct. 30, 1962 M. F. PETERS 3,061,039
FLUID LINE SOUND-ABSORBING STRUCTURES
Filed Nov. 14, 1957 9 Sheets-Sheet 7

INVENTOR.
MELVILLE F. PETERS
BY Albert H. Kronman
ATTORNEY

Oct. 30, 1962 M. F. PETERS 3,061,039
FLUID LINE SOUND-ABSORBING STRUCTURES
Filed Nov. 14, 1957 9 Sheets-Sheet 8

INVENTOR.
MELVILLE F. PETERS
BY
ATTORNEY

Oct. 30, 1962   M. F. PETERS   3,061,039
FLUID LINE SOUND-ABSORBING STRUCTURES
Filed Nov. 14, 1957   9 Sheets-Sheet 9

INVENTOR.
MELVILLE F. PETERS
BY
ATTORNEY

United States Patent Office 3,061,039
Patented Oct. 30, 1962

3,061,039
FLUID LINE SOUND-ABSORBING STRUCTURES
Melville F. Peters, Livingston, N.J., assignor of fifty percent to Joseph J. Mascuch, Millburn, N.J.
Filed Nov. 14, 1957, Ser. No. 696,452
2 Claims. (Cl. 181—42)

This invention relates to sound-absorbing and dissipating structures and particularly to devices which may be incorporated with a fluid conducting line to attenuate and eliminate sound passing therethrough.

The passage of sound energy through a fluid bearing line is highly objectionable in many military and civilian installations. Such sound energy may originate at a pumping station, turbine or engine. Sound energy transmitted by a fluid line can travel great distances and provide great annoyance. In addition, such sound energy aids in the detection of the location of the sound producing source.

Accordingly, it is an object of the present invention to provide means for blocking sound vibrations in a fluid line.

Another object of the present invention is to provide structures which will block sound vibrations without restricting the flow of fluid through the line.

A further object of the present invention is to provide sound blocking devices which will occupy a minimum amount of space.

An object of the present invention is to provide sound-absorbing structures which can be tuned to a variety of sound frequencies within a fluid line.

Still another object of the present invention is to provide sound absorbing devices for high pressure, high temperature lines.

A further object of the present invention is to provide a combined sound and shock absorbing structure.

An object of the present invention is to provide structures which will absorb the different types of sound energy traveling through a fluid line and the fluid therein.

A feature of the present invention is its use of bellows structures to filter sound from a fluid line.

Another feature of the present invention is its tunable bellows structure.

A further feature of the present invention is the use of colloidal material adjacent the fluid line to absorb sound.

A feature of the present invention is the use of bellows assemblies of dissimilar effective areas to absorb sound.

Still another feature of the present invention is the use of elastomers in conjunction with rigid bellows elements to absorb sound in a fluid line.

A feature of the present invention is the use of inorganic, high temperature resistant sound absorbing materials in conjunction with bellows to absorb sound.

Another feature of the present invention is the incorporation of areas of dissimilar, sound absorbing materials into the wall of a fluid bearing line.

A feature of the present invention is its use of a sound absorbing layer around a fluid bearing line.

A feature of the present invention is the incorporation of structural elements composed of materials having different characteristic impedances into a system with sound attenuating bellows.

The invention consists of the construction, combination and arrangement of parts, as herein illustrated, described and claimed.

In the accompanying drawings, forming a part hereof, are illustrated several embodiments of the present invention, in which.

It is to be understood that in the foregoing drawings the comparative wall thicknesses between the fluid lines and the bellows are merely illustrative and not drawn to scale. In actual construction the wall thickness of the bellows will be considerably less than that of the fluid line in which it is incorporated.

While one of the most desirable ways to dissipate the energy of sound is in the form of heat, the equipment required to convert all of the sound energy coming through a fluid line into heat would be very large. In order to reduce the size of the sound-absorbing structure, it has been found possible to dissipate only a portion of the sound energy as heat, and reflect the remainder back to the point of origin of the energy, or to some other branch point or points between the portions of the line.

Sound energy is converted into heat energy by means of an acoustical resistance. An acoustical resistance may be obtained by forcing fluids through small tubes, holes, slots, screens, sintered ceramic materials, metals with high porosity, glass, or mineral wool, and other materials such as silk, wool, porous blocks, etc. The resistance to the sound wave is caused by the frictional forces acting between adjacent layers of the fluid, and these losses become relatively great when the fluid is forced to move in small enclosures, because the velocity of the fluid in contact with the surface of the enclosure is very close to zero, and it is a maximum in the central portion of the enclosure.

This inner friction which tends to bring to rest portions of the fluid which are moving relative to one another, is called viscosity. From this it follows that the frictional losses, which a fluid experiences as it passes through a hole, will increase with an increase in its viscosity, and will decrease with an increase in the diameter of the opening, because the ratio between the wall area of the enclosure to the volume of the enclosure will increase as the size of the hole is increased.

Figure 1:
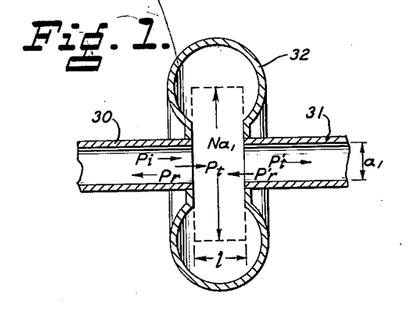
FIGURE 1 is a diagrammatic view in longitudinal section showing the application of a single convolution bellows as a sound-absorbing element in a fluid line.
Figure 2:
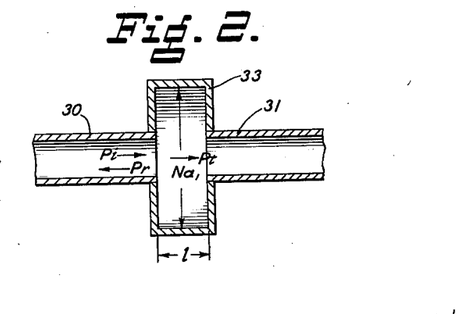
FIGURE 2 is a view similar to FIGURE 1, illustrating the principles involved therein.

Referring to FIGURES 1 and 2, there is shown in somewhat diagrammatic form the manner in which sound, present in a fluid-bearing line 30, is blocked before it can reach the second portion of the line indicated at 31.

The bellows assembly 32, shown in FIGURE 1, provides a highly satisfactory means for converting sound energy into heat energy. In addition, the bellows 32 serves as a flexible fluid seal for the conduits 30, 31.

For the purpose of simplification, the bellows 32 has been shown in FIGURE 1 as a single convolution. However, as will hereinafter appear, bellows consisting of a plurality of disc-shaped members welded together, may be used to practice the present invention.

The bellows principle and the forces involved are best illustrated from a consideration of FIGURES 1 and 2. In FIGURE 1 the inlet pipe 30 is shown having a diameter $a_1$, a bellows convolution 32 of length $l$, and an outlet pipe 31 having a diameter $a_1$. The effective diameter of the bellows 32 is indicated as $na_1$, and is shown by the dashed lines for $n > 1$.

As used herein, the term "effective diameter" of a bellows convolution means that if a piston had a diameter equal to the effective diameter of the bellows, both the piston tube and the bellows would exert the same force, when restrained from moving when subjected to pressure.

The effective area of a bellows could be determined by noting the volume change when the bellows undergoes unit displacement, and then calculate the diameter a piston must have to have the same volume displacement.

FIGURE 2 clearly illustrates the above principle, by showing inlet pipe 30 and outlet pipe 31 of equal diameter, and the enlarged central portion 33 having a length $l$ has the same diameter $na_1$ equal to the effective diameter of the bellows 32.

When a sound wave, having an intensity indicated as $p_i$ in FIGURES 1 and 2, reaches the enlarged section of both illustrations, a portion of the wave indicated by the arrow $p_r$ will be reflected. The remainder of the wave indicated by the arrow $p_t$ will be transmitted.

The passage of a sound wave into an enlarged section of pipe has the same effect upon the sound wave as if it passed into a medium of lesser density. As a result, the reflected portion $p_r$, of the wave will be 180° out of phase with the incident wave $p_i$. When the transmitted portion, $p_t$, of the wave reaches the entrance to the outlet pipe 31 a part of the wave $p_t$ will be transmitted, as indicated by the arrow $p'_t$, and the remainder of the wave will be reflected as shown by the arrow $p'_r$. The passage of the wave to a reduced section of the pipe has the same effect on the sound wave as if it passed into a medium of greater density. The wave will therefore be reflected 180° out of phase. It will thus be apparent that the sound wave will be reflected back and forth between the surfaces at each side of the enlarged bellows 32 or chamber 33. A resonant condition is thereby established in the enlarged section of the pipe assembly. That portion of the sound energy which is not dissipated in the form of heat by the enlarged chamber is directed back to the source of energy instead of continuing along the outlet pipe 31.

In addition to its effectiveness as a sound trap, the bellows structure may be placed in a fluid-bearing line without interfering with the flow therethrough.

Figure 3:
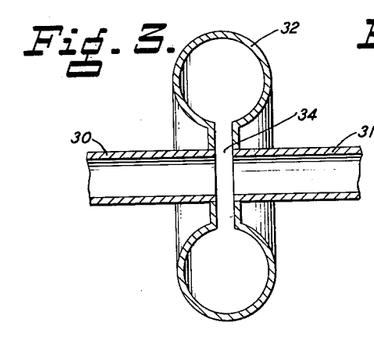
FIGURE 3 is a diagrammatic view in longitudinal section, illustrating a tunable sound-absorbing bellows.

In many installations the sound energy may cover a wide band of frequencies. These frequencies may change from time to time as the speed of the noise producing equipment is varied. Referring to FIGURE 3, it will be seen that the bellows structure is particularly suited to the control of sounds over a wide band of frequencies. In FIGURE 3 the fluid line 30 and the outlet line 31 shown in FIGURE 1 have been brought together until the bellows 32 assumes a different configuration.

By adjusting the separation of the fluid lines 30 and 31, the sound trap can be tuned to the frequency of the sound being produced. The resonance frequency of the bellows or resonator is changed by varying the cross-sectional area of the opening 34 into the bellows 32. The entrance to the resonator or bellows 32 can be assumed to have the properties of a slit and the resistance of the opening 34 can be increased by decreasing the cross-sectional area of said opening.

Figure 4:
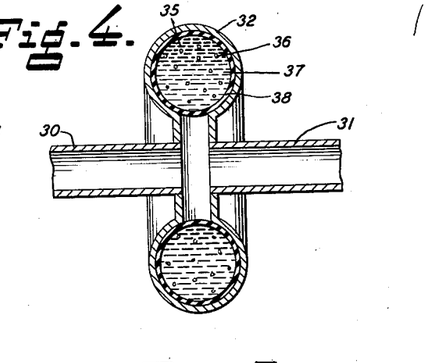
FIGURE 4 is a view in longitudinal section similar to FIGURE 3, showing the use of a sound-absorbing medium within the bellows.
Figures 5, 6, 7:
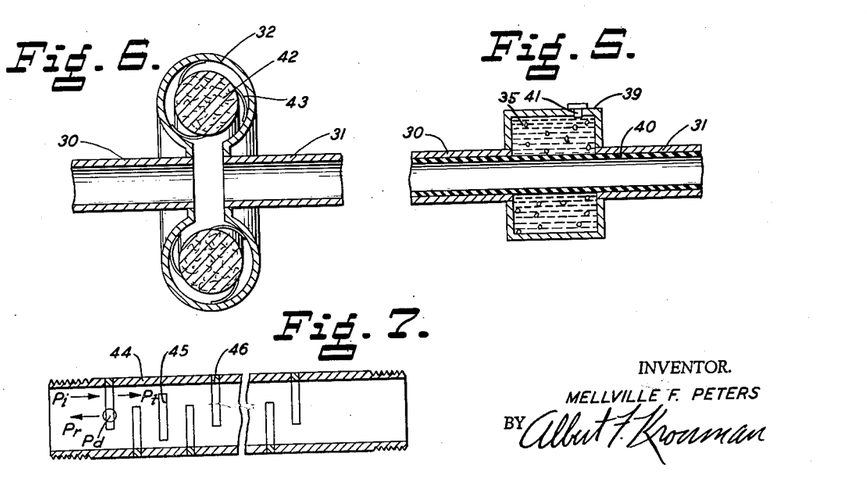
FIGURE 5 is a view in longitudinal section showing another embodiment of a sound-absorbing structure, according to the present invention.
FIGURE 6 is a view similar to FIGURE 4 showing the use of a high temperature resistant sound-absorbing medium.
FIGURE 7 is a view in longitudinal section of a fluid line illustrating another sound-absorbing structure according to the present invention.

The resistance to sound energy of the bellows can be improved without interfering with the flow of fluids through the system by placing an acoustical resistor element in the enlarged section, as illustrated at 35 in FIGURES 4 and 5. The acoustical material 35 may comprise a number of particles 36 in colloidal form suspended in a fluid 37. The fluid 37 is preferably of a thickness greater than the diameter of the colloid particle, but less than two times the particle diameter.

Specific examples of colloid particles suitable for the practice of the present invention are finely dispersed mercury, gold, tungsten, etc., supported in a liquid such as water, alcohol, oil, etc. This arrangement of colloidal particles suspended in a fluid of approximately one colloid thick can be referred to as a screen of one ply. Since a sound wave passing through the thin layer of particles suspended in the liquid must impart a portion of its energy to the particles, and since the mass is not infinite, the particles must move in the liquid and thereby dissipate energy. The thickness of the film may be increased to a suitable thickness for the purpose of absorbing sound.

An acoustical resistance can be formed by using particles of material in colloidal form which are in themselves not classed as a heavy material, but which absorb a portion of the supporting fluid. Such a material is magnesium-hydroxide, which surrounds itself with several layers of water when water is the supporting medium. Since the characteristic impedance of the water enveloping the colloids is the same as the water supporting the colloids, except for a slight distortion caused by the colloid field, there will be very little energy reflected from the water enveloping the colloids. As the sound wave passes through the enveloping layers of water and approaches the hydroxide molecule, reflection will take place from the colloid and the molecule with a large part of its enveloping water will be dragged through the supporting fluid. This movement can be in the form of a vibration and, because of the viscosity of the water, energy will be absorbed from the sound wave and converted into heat.

The colloids and their supporting fluid must be sealed in fluid-tight containers so that the colloidal material will not mix with the fluids in the line. The sealing material must form a fluid-tight envelope and at the same time allow the sound waves to pass therethrough with very little reflection. It is therefore preferable to use a material for the envelope which has the same characteristic acoustic impedance as the fluid in the line. Thus, for example, when the line contains water the envelope 38, shown in FIGURE 4, may be made of Rho-c rubber, since Rho-c rubber has the same characteristic impedance as water.

To further increase the efficiency of the colloidal screen, the supporting fluid for the colloids should also have the same characteristic impedance as the envelope 38. In a fluid line for water the supporting fluid for the colloids should also be water. Where oil is to be transmitted through the fluid line, the container for the colloids should be formed from some material having the same characteristic acoustic impedance as oil, and the supporting fluid 37 should be either oil or some other fluid of similar characteristic.

Referring to FIGURE 4 it will be seen that the envelope 38 containing the colloidal material is placed in the enlarged section 32 of the bellows between the inlet line 30 and the outlet line 31. The resistor element will thus not interfere with the flow of fluid in the line. In FIGURE 5 a short enlarged section of pipe 39 is incorporated within the fluid line and a liner 40 disposed within the said fluid-bearing line. An opening 41 is provided in the enlarged pipe 39 through which the colloidal suspension may be introduced. It will be understood that the material from which the liner 40 is formed will have the same characteristic impedance as the fluid passing through the line, and is preferably bonded to the wall of the pipe 30, 31.

Where the operating temperatures of the fluid-bearing system are too high to use a colloidal screen as a resistor element, the structure shown in FIGURE 6 may be employed. In this embodiment the sound-absorbing material 42 is formed of some inorganic material bonded together. The material 42 may have a porous structure such as that of sintered metal oxides, or it may have a thread-like structure such as glass wool, quartz wool, or metal wool. The inorganic material 42 must be held together to prevent it from entering the fluid line. The material may be held together by sintering, strapping, or the like. It is preferred to maintain a space between the sides of the bellows 32 and the sound-absorbing material 42. For this purpose springs 43 may be employed. The springs 43 should be adjusted so that when the assembly is subjected to vibration the sound-absorbing material 42 will not strike the walls of the bellows 32. With the construction shown in FIGURE 6, the fluid within the resistor element 42 will be the same as that in the fluid line and therefore the characteristic acoustic impedance will be identical.

Sound waves traveling in fluid-filled conduits are conducted by both the fluid and the structure of the conduit. It is therefore necessary to employ a sound filter assembly which will attenuate the sound energy in both the fluid and the said supporting structure, e.g. the line. The embodiments shown in FIGURES 7, 8, 9 and 10 are particularly suited for absorbing sound energy passing along the structure of the conduit.

Referring to FIGURE 7, it will be seen that a length of conduit 44 is provided with a series of slots 45. The slots 45 are staggered so that the conduit or pipe 44 will be strong enough to withstand high pressures. The slots 45 are then filled with a material 46 which has a suitable characteristic acoustic impedance. Thus, for example, when the conduit 44 is a brass or steel pipe, the material in the slots 45 may be lead or rubber. As indicated by the arrows in FIGURE 7, a portion $p_r$ of the incident sound wave $p_i$ is reflected, a portion $p_d$ is dissipated, and a portion $p_t$ is transmitted at each slot 45. The effect brought about upon the sound wave, is the result of its passing from the medium of the conduit 44 with its characteristic impedance to that of the slot material 46 having the selectively different impedance. Since the slots 45 are staggered, the sound wave will contact many boundary surfaces in traveling the length of the conduit 44. A portion of the wave energy will be reflected and a portion will be dissipated at each boundary, resulting in a rapid attenuation of the sound energy as it travels along the pipe 44.

Figure 8:
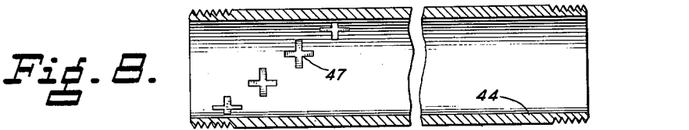
FIGURE 8 is a view similar to FIGURE 7 showing a further embodiment of the present invention.
Figures 10, 11:
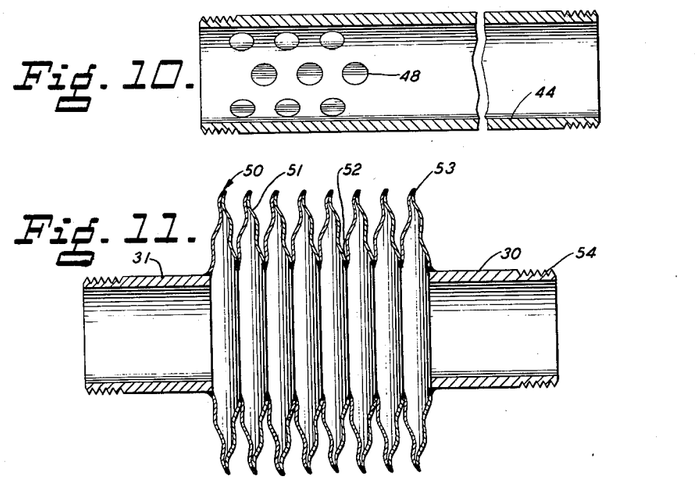
FIGURE 10 is a longitudinal sectional view of a fluid line showing sound-absorbing elements in the wall thereof.
FIGURE 11 is a longitudinal sectional view of a sound-absorbing bellows made in accordance with the present invention.

In addition to the slots shown in FIGURE 7, the staggered openings in the conduit 44 may be given other shapes such as the crosses 47 shown in FIGURE 8, and the circular openings 48 shown in FIGURE 10. In each case the openings 47, 48 are filled with metal or rubber or some other material having suitable sound absorbing properties. The important requirement common to all forms of sound-absorbing structures employing filled openings is that the shapes present a staggered path in traversing which the sound energy encounters a large number of boundary surfaces. In addition, the slots must not weaken the structure of the conduit beyond its use requirements.

Figure 9:
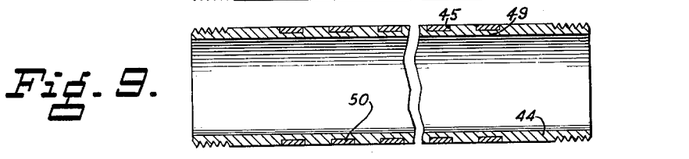
FIGURE 9 is a view similar to FIGURES 7 and 8 illustrating a sound absorbing structure for use in lines carrying corrosive fluids.

In systems handling corrosive fluids, the slots 45 should not be cut through to the inner surface of the conduit 44. To do so, would bring about the corrosive action present when two dissimilar metals are brought together in the presence of an electrolyte. The embodiment shown in FIGURE 9 provides a structure which will absorb sound while leaving a thin protective layer 49 on the inside of the conduit 44. The openings 50 in this form of the invention are cut part way through the wall of the conduit 44. The openings are staggered and subsequently filled with a sound-absorbing metal or rubber, as hereinabove set forth.

While the foregoing description and illustrations have employed a single convolution bellows or enlarged chamber for the purpose of simplification, it is within the purview of the present invention to employ bellows having a plurality of convolutions in order to achieve additional and highly desirable results. The entrance to each convolution in a bellows can be considered an orifice or throat. Since the bellows plates are very close to one another, the action of a plurality of convolutions is that of their equivalent parallel acoustic impedance. In addition, the low frequency attenuation of a number of suitably placed orifices can be made much greater than that of a single orifice of equal total area. The wave length at which an enlarged chamber or bellows convolution will attenuate the sound energy depends upon both the volume of the chamber and the cross-sectional area of the entrance or throat. As previously set forth in connection with FIGURE 3, both the volume of the bellows convolution and the cross-sectional area of the throat or entrance can be changed by expanding or compressing the multi-convoluted bellows.

Referring to FIGURE 11, there is shown a bellows 50 which may be fabricated from metal plates or from elastomers. When fabricated from metal plates the bellows 50 is assembled by welding plates 51 together at their inner peripheries 52 to form pairs. The pairs are then welded together at their outer peripheries 53 to form the bellows assembly. Conduits 30 and 31 are welded to the ends of the bellows 50. Threads 54 may be provided at each end of the conduits for connection into a fluid system. When the bellows 50 are formed from elastomers the bellows can be molded in the conventional manner and the ends thereof attached to the conduits 30, 31 during the molding process. Highly satisfactory results have been achieved when the elastomers have the same characteristic impedance as the fluid passing through the line.

Figure 12:
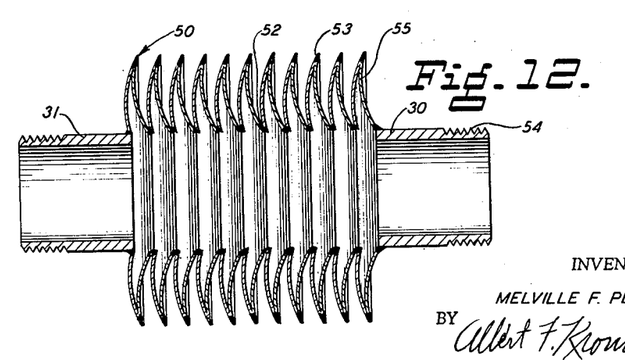
FIGURE 12 is a view similar to FIGURE 11, of a high pressure and temperature sound-absorbing bellows structure.
Figure 13:
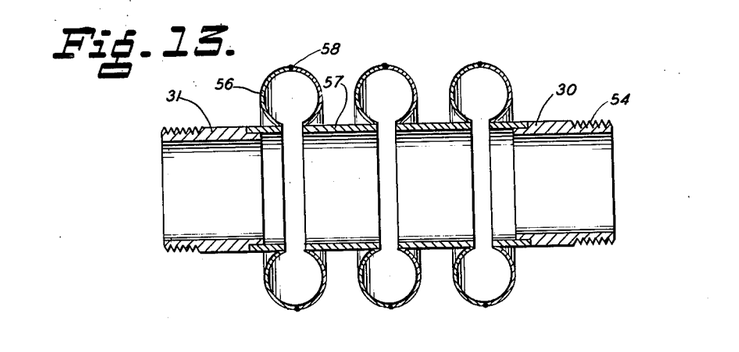
FIGURE 13 is a complete embodiment employing the principles illustrated in FIGURE 3.
Figure 14:
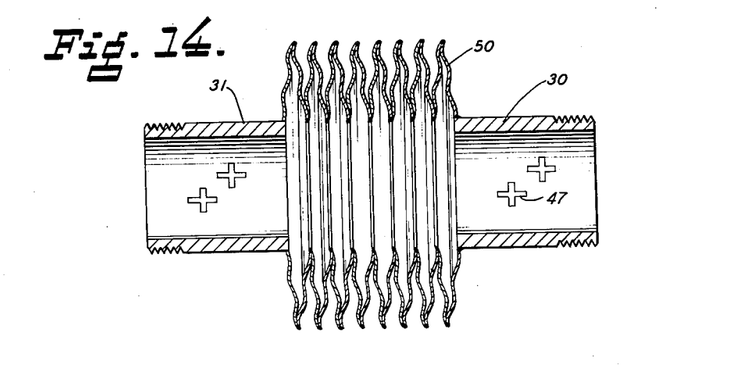
FIGURE 14 is a view similar to FIGURES 8 and 11, showing the combination of a low pressure, short working stroke sound-absorbing bellows and sound absorbing elements.

Tests made upon an assembly in accordance with the embodiment shown in FIGURE 11 employing a bellows with seven convolutions formed from plates having an outside diameter of 6½ inches, an inside diameter of 2½ inches welded to steel nipples 2″ in diameter and 6″ long attenuated a sound wave 30 decibels for a frequency range of 230±10 c.p.s., 25 decibels for a frequency range of 320±10 c.p.s. and 20 decibels for a frequency range of 500±10 c.p.s. The overall length of the bellows 50 was one inch, throat width ⅛ inch.

Where fluids under extremely high pressures, in excess of 3000 p.s.i., are to be conducted through the line, it is necessary to employ bellows of a shape capable of withstanding such pressures. The bellows forms shown in FIGURES 12 and 13 are such structures. In FIGURE 12 the bellows plates are formed of metal having a parabolic cross-sectional shape 55. In FIGURE 13 the inner peripheries of the metal plates 56 are welded to heavy rings 57 and to each other at their outer peripheries, as indicated at 58.

Where the pressure differential is relatively low across the bellows plates, the bellows forms shown in FIGURE 14 may be used. In this embodiment of the invention the working stroke for each bellows convolution can be made ¼″ or more.

Figure 15:
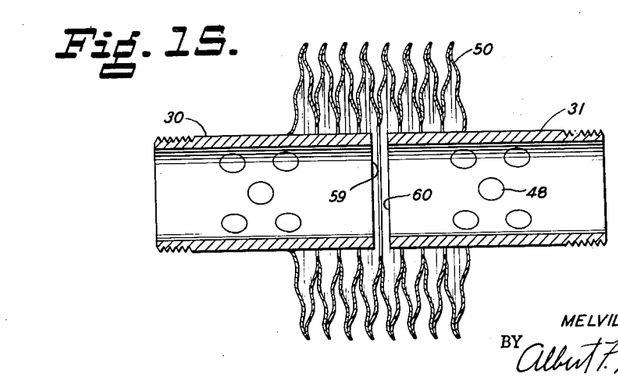
FIGURE 15 is a view similar to FIGURES 11, 12, 13 and 14, showing combinations of other forms of sound-absorbing bellows in accordance with the present invention.

FIGURE 15 shows still another form of bellows assembly which may be used as a sound trap in accordance with the present invention. In this embodiment the bellows 50 is assembled as hereinabove described, and attached at each end thereof to the conduits 30, 31 at a point spaced from the inner ends 59, 60 of said conduits. Attenuation measurements made upon this bellows assembly indicate an attenuation of 35 decibels at 320± c.p.s. when the overall length of the bellows was 1″, and an attenuation of 70 decibels at 230± c.p.s. when the assembly was stretched until the bellows length was 3¼″. It is to be understood that regardless of the shape of the bellows plates it is always possible to tune the bellows assembly by expanding or compressing the bellows, so that it can be made to serve as a wave trap for any predetermined band of wave lengths.

Figure 16:
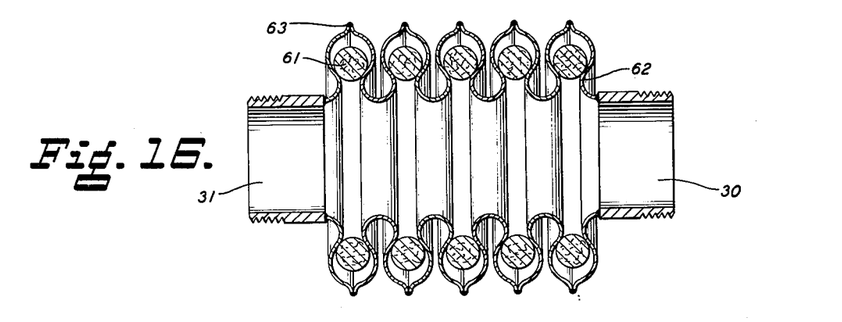
FIGURE 16 is a view in longitudinal section showing a complete embodiment of the present invention employing the principles illustrated in FIGURE 6.

As previously pointed out in connection with FIGURES 4, 5, and 6, the resistance to sound energy and therefore the dissipation of sound energy as heat can be further carried out by filling the convolutions of the bellows with a sound absorbing material. Porous ceramic material which is bonded together and will not be carried away by the fluid in the system may be used for this purpose, as shown at 61 in FIGURE 16. In this embodiment the assembly may serve as an expansion joint as well as a sound trap, since the space provided between the absorbent material 61 and the bellows plates 62 permits the bellows assembly to expand and contract. The bellows plates 62 are assembled by welding pre-formed membranes together at 63. Such bellows 62 may also be formed from a tube by applying fluid pressure to the tube while it is held within a die. When the bellows is subjected to vibration, the sound-absorbing material 61 may have to be isolated so that particles of the material broken off by the impact of the absorbent material against the bellows wall will not pass into the fluids in the system.

Figure 17:
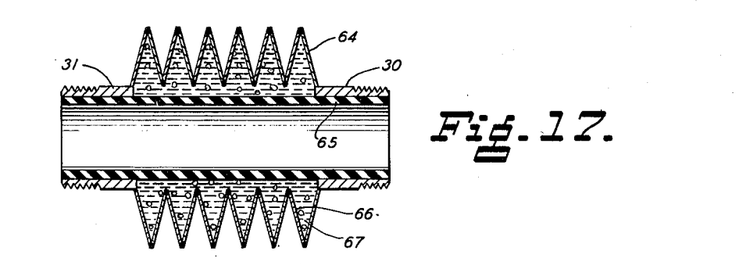
FIGURE 17 is a view in longitudinal section of a further embodiment of a sound-absorbing structure in accordance with the present invention.

One method of preventing the sound absorbing material from entering the fluid line is shown in FIGURE 17. In this embodiment of the invention, a bellows somewhat diagrammatically illustrated at 64 is joined at each end to the inlet and outlet conduits 30, 31. A liner 65 is bonded to the inner wall of the conduits 30, 31. As previously set forth, the liner 65 preferably has the same characteristic impedance as the fluid which is passing through the conduits 30, 31. The space 66 is between the liner 65 and the inner bellows walls is filled with a sound-absorbing material 67. The material 67 shown in FIGURE 17 may be a colloidal suspension, as previously described, having the same characteristic impedance as the elastomer 65 and the fluid passing through the conduits. Alternately, the porous ceramic material 61 previously referred to may be substituted for the colloidal suspension.

Figure 18:
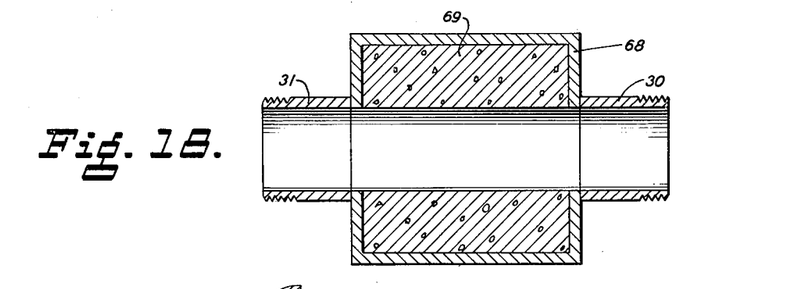
FIGURE 18 is a view in longitudinal section showing the use of conduits of dissimilar size containing sound-absorbing material, within a fluid line.

FIGURE 18 employs a chamber 68 formed from an enlarged section of pipe between the conduits 30, 31. The enlarged chamber 68 is filled with a sound absorbent material 69 such as plates of porous ceramic material and the like. The fluid carried by the conduits 30, 31 fills the pores of the sound absorbing material in this form of the invention.

Figure 19:
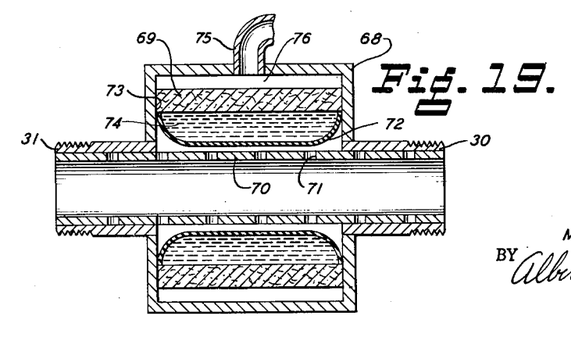
FIGURE 19 is a view in longitudinal section of a combined expansion chamber and sound trap in accordance with the present invention.

In FIGURE 19 there is shown a combined expansion chamber and sound trap. In this embodiment of the invention the two conduits 30, 31 are connected to the larger chamber 68 and to a liner 70 which is secured to the inner walls of the conduit 30, 31. The liner 70 is provided with a series of holes 71. An elastomer bag 72 is secured to the walls 73 of the enlarged chamber 68. The elastomer bag 72 surrounds the liner 70 and overlies those holes 71 in the said liner which are surrounded by the large chamber 68. The area within the large chamber 68 above the elastomer bag 72 may be filled with a suitable fluid 74 and sound absorbent material 69. It is to be understood that the holes 71 are small compared to the thickness of the elastomer bag 72 to prevent damage to the elastomer bag 72 by the edges of said holes. A tube 75 is secured to the enlarged chamber 68 and communicates with the interior of the said chamber. Gas under pressure, indicated at 76, is forced through the tube 75 into the chamber 68. When a surge takes place within the fluid conducting conduits 30, 31, the gas 76 within the chamber is compressed by the bag 72 which is forced outward by the pressure of the fluid in the line exerted through the holes 71.

When sound energy reaches the enlarged chamber a portion of the energy will pass through the walls of the liner 70 and the fluid in the holes 71, contacting the elastomer bag 72. When the characteristic impedance of the elastomer bag 72 and the fluid within the enlarged chamber 74 is the same as the characteristic impedance of the fluid in the line, the sound energy will be conducted into the sound absorbent material 73, where it will be dissipated.

Figure 20:
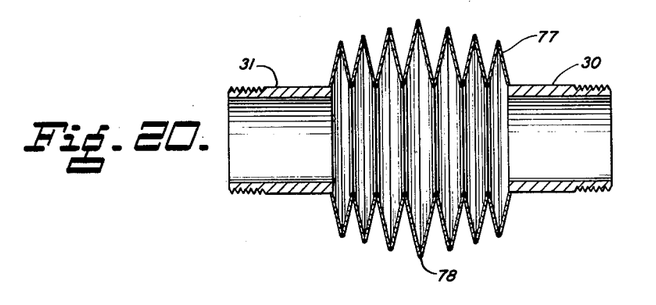
FIGURE 20 is a view in longitudinal section of a sound-absorbing bellows having a symmetrical graduated structure, a further embodiment of the present invention.

It will be apparent that different shapes of bellows can be employed in addition to those previously disclosed for the purpose of securing specific sound-absorbing and other advantages. In FIGURE 20 there is shown a bellows structure 77, which is symmetrically formed about a centrol convolution 78 on either side of which the convolutions diminish in size as they approach the point where they are secured to the conduits 30, 31. Since the bellows 77 is symmetrical about the central convolution 78, there will be two convolutions, one on each side of the convolution 78, which have the same volume. The length of the sound wave attentuated by this structure will be a function of the volume of the central convolution 78 and the volume of the pairs of identical convolutions on each side thereof.

Figure 21:
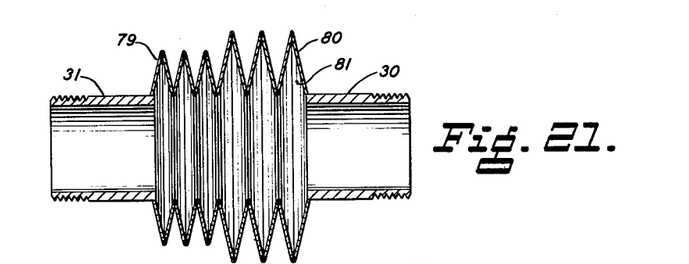
FIGURE 21 is a view similar to FIGURE 20, showing the use of bellows of different effective areas as sound-absorbing structures.

In FIGURE 21 there is shown a sound-absorbing structure comprising a bellows 79, 80 joined together and secured to the conduits 30, 31. The bellows 79 is smaller than the bellows 80. The difference in size, results in a difference in their effective or piston areas. Since the effective area of the bellows 80 is greater than the effective area of bellows 79, an increase in the pressure within the line will increase the length of bellows 80 and decrease the length of bellows 79, without changing the overall length of the two bellows as assembled. Similarly, a decrease in the line pressure will decrease the length of the large bellows 80 and increase the length of the bellows 79, without affecting the space between the lengths of conduit 30, 31 to which the bellows are attached. Since a change in pressure is accompanied by a change in the distance between all of the bellows plates in the bellows 79 and 80, a change in pressure can be used to control the size of the throat or opening 81 from the line into the bellows members. The volume of the bellows 79 and 80 can also be controlled by changing the effective pressure in the line. In this way a change in the pressure can be used to tune the bellows to the desired sound frequency.

Figure 22:
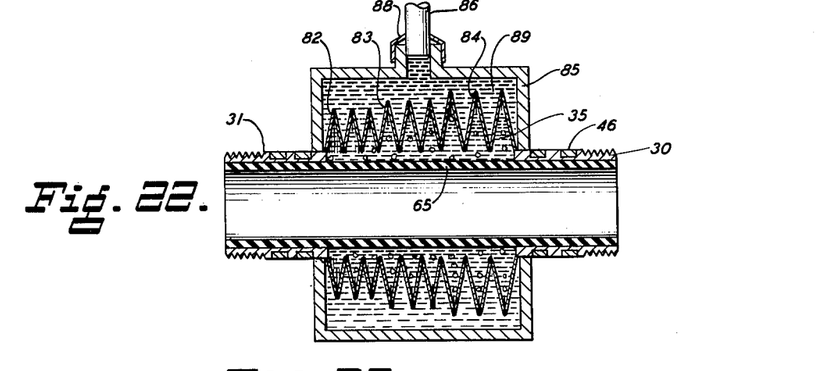
FIGURE 22 is a view similar to FIGURE 21 illustrating the use of a plurality of bellows of different effective areas in combination with other sound-absorbing structures, according to the present invention.
Figure 23:
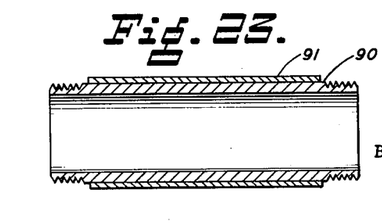
FIGURE 23 is a view in longitudinal section of a fluid line having a sound-absorbing layer therearound.

Referring to FIGURE 22, there is shown the application of a three-piston area bellows formed by joining together bellows assemblies 82, 83, 84, having progressively larger sizes. The assembly is enclosed in an enlarged chamber 85, which is provided with an inlet pipe 86. The enlarged chamber 85 is secured to an inlet conduit 30 at one end and an outlet conduit 31 at the opposite end, so that the unit may be connected into a fluid system. A liner 65, having the same characteristic impedance as the fluid to be led through the line, is bonded to the walls of the conduits 30, 31, and a suitable sound-absorbing material such as the colloidal suspension 35, hereinabove referred to, may be placed between the liner 65 and the inside of the bellows 82, 83, 84. The fluid of the suspension should have the same characteristic impedance as the liner 65 and the fluid passing through the line. Valve means 88 is provided to control the passage of a fluid or gas 89 through the pipe 86 into the space between the chamber 85 and the outside surfaces of the bellows 82, 83, 84. The pressure within this chamber can be controlled by bleeding the fluid or gas 89 in and out of the chamber by means of the valve 88 and pipe 86. In this manner, the bellows may be tuned to attenuate a wide variety and plurality of sound wave lengths.

Where the pressures or temperatures in a line are too high to employ an elastomer hose or bellows, the embodiments previously described in connection with FIGURES 7, 8, 9 and 10 may be used. In addition, the structure shown in FIGURE 23 has been found to be effective. In FIGURE 23 the conduit 90 is provided with sound absorbing material in intimate contact with the surface thereof and is covered with a sound-absorbing layer 91 which is electroplated or soldered therearound. Sound which is transmitted through the structure of the conduit 90 will be absorbed and dissipated by the sound absorbing material 91, which may be, for example, lead, some other soft metal or an elastomer.

Figure 24:
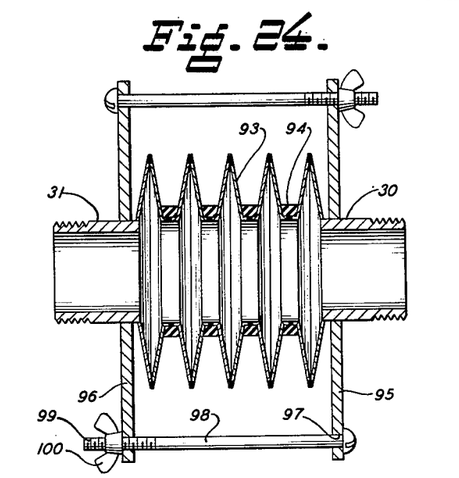
FIGURE 24 a view in longitudinal section showing a bellows combining metal and elastomers to form a sound-absorbing structure.

It is to be understood that it is contemplated to use the sound absorbing structure illustrated in FIGURES 7, 8, 9 and 10, which are adapted to absorb sound traveling through the structure of the line, in conjunction with the bellows described herein, which are best suited to absorb sound traversing the fluid. Thus, for example, the structure shown in FIGURES 14, 15 and 22, which contemplate the use of both bellows and conduit sound absorbing structures, may be employed with highly desirable results.

Where the inlet conduit 30 and the outlet conduit 31 may be subjected to axial rotation, and it is necessary to combine the assembly so that a single bellows removes both the fluid-borne and structure-borne noise, the bellows assembly shown in FIGURE 24 may be employed. In this embodiment of the invention the bellows assembly 92 consists of a series of plates 93 which are welded together at either their outer or inner peripheries, and bonded together at their unwelded peripheries by a suitable elastomer 94. Where the internal pressure is greater than the external pressure, the elastomer is placed at the inner periphery, as shown in FIGURE 24.

The bonding of the pairs of plates together with the elastomers 94 causes the sound waves to be reflected at the metal-elastomer surface, and consequently a large attenuation of the sound wave traveling through the conduits 30, 31 is achieved.

By adapting the location of the elastomer seal to the pressure conditions, it will be apparent that the elastomer is aways under compression. The result of such a structure is that rotation of a bellows is possible, without rupture of the structure at the elastomer, since the only force acting on the elastomer will be that of the rotation, and the elastomer is well within its elastic limit in the operation of the bellows. Structures of this type have been exposed to pressures of 450 p.s.i. extended plus or minus ⅛ inch per unit length and rotated 36° about its axis at 40° F. for over 50,000 cycles.

The use of the elastomer 94 permits of axial rotation, but where such rotation is not anticipated, lead or some soft metal may be substituted for the elastomers 94. When the bellows shown in FIGURE 24 is operated in conjunction with the high temperature sound-absorbing structure illustrated in FIGURES 7, 8, 9, 19 and 23, lead should be used in place of the elastomers.

In the preceding discussion of bellows used for the purpose of attenuating sound waves, reference has been made to tuning. There has been disclosed means for applying different pressures to the surface of the bellows for this purpose. However, it is within the purview of the present invention to achieve this result by employing mechanical means such as is shown in FIGURE 24. Spaced bracket members 95, 96 are secured to the conduits 30, 31, respectively. The brackets 95, 96 are provided with openings 97 through which bolts 98 may be slipped. The bolts 98 are threaded, as indicated at 99, and wing nuts 100, or some other suitable tightening means may be applied to the threaded end of the bolt 97. By tightening or loosening the nuts 100, the distance between the conduits may be varied, thereby compressing or extending the bellows to effect tuning.

When the operating temperatures are low and it is necessary to isolate the noises in a pipe from the structure which carries the pipe, it is common practice to support the pipe by means of wood, rubber, or some other plastic, or elastomer. However, where temperatures are extremely high, a suitable supporting means such as is shown in FIGURES 25 and 26 will be found to be highly desirable.

Figure 25:
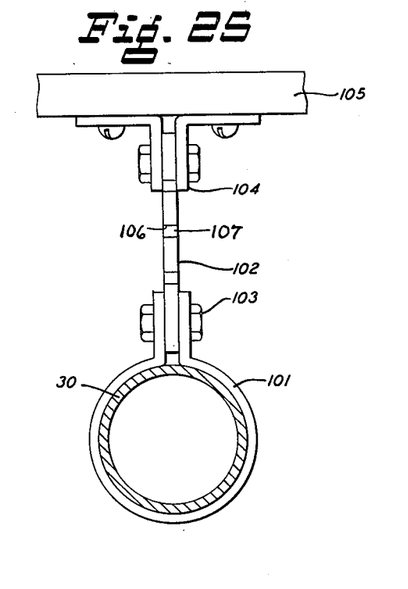
FIGURE 25 is a view in elevation showing a pipe hanger incorporating sound-absorbing members, in accordance with the present invention.
Figure 26:
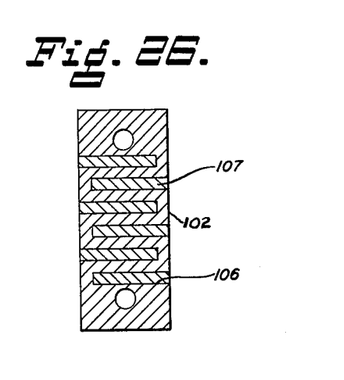
FIGURE 26 is a view in side elevation of the hanger link shown in FIGURE 25.

Referring to FIGURE 25, there is shown a pipe or conduit 30 which is carried in a bracket 101. The bracket 101 is secured to one end of a link 102 by a fastening means such as the nut and bolt 103. The upper end of the link 102 is secured to the bracket 104, which may be fastened to any supporting or adjacent structure, generally indicated at 105. The link 102 is provided with a plurality of slots 106, which slots are filled with a second material 107, having a different characteristic impedance than that of the strap material. As hereinabove set forth, the slots 106 are preferably staggered in their disposition on the link 102, so that sound attempting to traverse the strap will meet a series of sound-dissipating materials. It will be apparent that vibrations attempting to pass from the pipe through the strap 102 will be dampened as they pass through the different materials, and will be attenuated before they reach the supporting structure 105.

Figure 27:
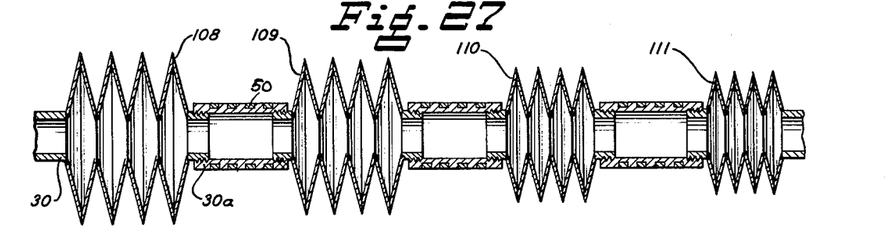
FIGURE 27 is a longitudinal sectional view taken through a series of bellows incorporated within a line, to form a sound-absorbing structure.

Referring to FIGURE 27, there is shown an assembly whereby all of the sound passing through a fluid bearing line can be attenuated.

The inlet portion of the line 30 may be provided with a series of filled slots, such as have hereinabove been described and shown in connection with FIGURES 7, 8, 9 and 10. Alternately, nipples 30a, having filled slots 50 therein, may be incorporated into the line for this purpose. A series of bellows members 108, 109, 110, 111 are incorporated within the line 30 in spaced relationship. The bellows members 108, 109, 110, 111 are of different size and are adapted to absorb different sound vibrations. Bellows 108 is of a size and is tuned to absorb the fundamental frequency which is in both the fluid and the structure of the line. Bellows 109 is tuned for the first harmonic which is also in the sound traveling through the fluid and the structure of the line. Bellows 110 is tuned for the third harmonic which is present in the sound traveling along the line, and bellows 111 is tuned for the fourth harmonic. As a result of this assembly only extremely high and inaudible frequencies with very little energy escape from both the conduit 30 and the fluid passing therethrough.

Figure 28:
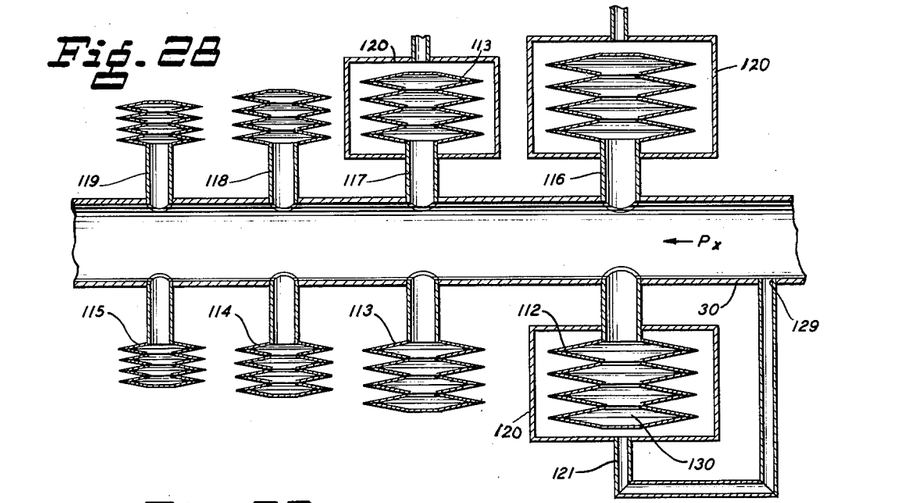
FIGURE 28 is a longitudinal sectional view showing another form of sound-absorbing structure using a plurality of bellows.

In FIGURE 28 there is shown a still further embodiment of the present invention, in which a plurality of bellows elements is employed in conjunction with a fluid bearing line to absorb the sound vibrations passing therethrough. With this structure it is possible to increase or decrease the wave length of the sound as it traverses the line, depending on the nature of the bellows elements employed. The bellows can be used to produce the effect of lengthening the pipe 30. The assembly shown in FIGURE 28 consists of paired bellows members 112, 113, 114, 115, connected to the fluid bearing conduit 30 by short lengths of conduits 116, 117, 118, 119.

It is to be understood that the number of paired bellows assemblies and their connecting conduits can be increased as desired. In this embodiment the fluid is unobstructed in its passage through the line 32, due to the structure of the sound absorbing device. The sound wave traversing the line 30 enters the first pair of bellows 112, and resonates within the sound trap formed by said bellows. Since this sound trap is tuned for a frequency which is the fundamental frequency, most of the sound will be confined therein. Bellows 112 and 113 are shown as surrounded by a chamber 120. The chamber 120 is in communication with a pipe 121 by means of which pressure may be applied to the area within the chamber 120. By varying the pressure within the chamber 120, the bellows pairs 112, 113 may be tuned to absorb the desired frequency. It is to be understood that each of the bellows pairs illustrated in FIGURE 28 may be similarly supplied with a chamber 120 for this purpose.

In many installations the wave length of noise may change rapidly. To attenuate such noise it is necessary to rapidly re-tune the sound absorbing structure, such as the bellows. Factors, such as changes in pressure, which in turn may cause a change in the wave length of the noises being transmitted, must be compensated for in order to continue to absorb said noises. Such conditions may be found, for example, in marine installations.

A structure whereby changes in pressure in the system, which may cause a shift in the wave length of the sound, can be used to re-tune the bellows, is illustrated at the right in FIGURE 28. In addition to the re-tuning of the bellows, this device prevents damage to the bellows by sudden increases in pressure.

The self-adjusting resonating structure shown in FIGURE 28 is attached to the line 30, which is filled with a fluid at a pressure indicated as $P_x$. The bellows portion 112 of the device is attached to the line by means of a short length of tubing 116. The chamber 120 surrounds the bellows 112 and is sealed to the tubing 116. As previously set forth, the chamber 120 is in communication with a pipe 121, through which fluid under pressure may enter the said chamber. The other end of the pipe 121 is connected to the line 30, as indicated at 129. The fluid in the line 30 may thus pass freely from the line to the chamber 120 through the small opening in the pipe 121.

Sound passing along the fluid line 30 and through the fluid therein will enter the chamber 130 within the bellows 112. When a surge takes place in the line 30 the pressure in the chamber 130 will be varied in accordance with the pressure in the line. However, the pressure in the chamber 130 will follow that of the pressure in the line faster than that of the pressure of the fluid within the chamber 120. The differential is the result of the difference in openings between the tube 121 and the conduit 116. A change in the pressure within the line 30 will thereby vary the volume of the chamber 130 within the bellows 112, thereby allowing the bellows assembly to serve momentarily as a surge chamber.

Under static conditions the volume of the resonant chamber 130 is independent of the pressure within the line 30. The sound-absorbing bellows 112 do not become tuned unless there are changes in pressure in the line 30. The bellows 113 is tuned by changing the pressure in the chamber 130 either manually or by some suitable mechanical means.

It will be apparent that the above-described device can also serve as a surge chamber in a fluid bearing line. Such applications are important where a pulsating pump is responsible for initiating both pressure waves and sound waves. In such installations both the pulsating pressure and the sound is reduced.

Figure 29:
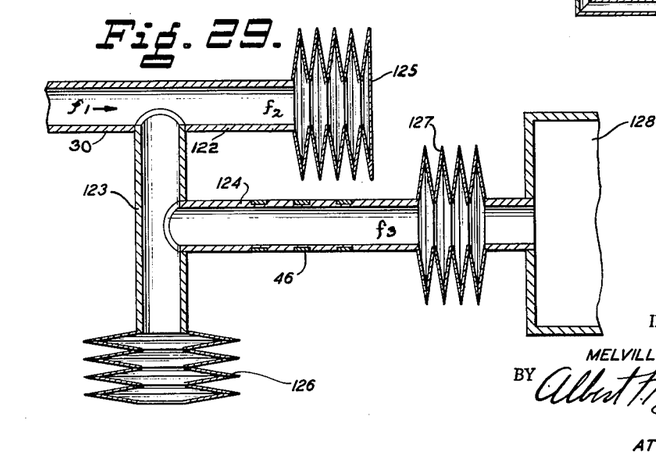
FIGURE 29 is a longitudinal sectional view showing the use of a bellows assembly, whereby various frequencies of a sound wave may be filtered out.

Referring to FIGURE 29, there is shown a bellows conduit assembly secured to a tank for the purpose of reducing the sound within the fluid of the tank to a very low intensity. Each of the branches is formed with a bellows member 125, 126, 127, respectively. Sound-absorbing inserts 46 may also be provided in the line 30 and branches, for the hereinabove described purpose.

The sound at frequency $f_1$ enters the bellows 125 through the conduit 30. The fluid in the bellows 125, the conduit 30 and branches 122, 123, 124, and the bellows 126 resonate at a frequency $f_1$ or a harmonic of $f_1$ which is $f_2$. The sounds which escape through the fluid enter the bellows 127 which resonates at $f_2$, or one of the harmonics of $f_2$, which is $f_3$. Since the bellows 125, 126, 127 operate as sound traps, very little of the initial sound energy entering the line 30 is transmitted to the tank 128.

The sound borne by the structure of the conduit 30 is intercepted and attenuated by the inserts 46, which may be incorporated at other portions of the line, such as between the bellows 127 and the tank 128.

It is within the purview of the present invention to tune the bellows 125, 126, 127 for the purpose of matching the frequencies of the sounds passing through the line 30, by any of the herein described means.

Figure 30:
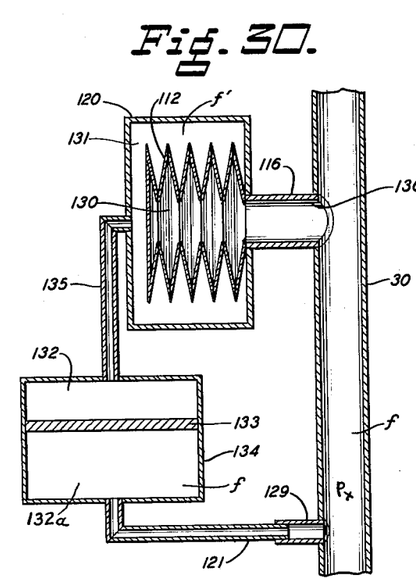
FIGURE 30 is a view in longitudinal section showing a self-tuning sound attenuating and surge absorbing structure, another embodiment of the present invention.

The sound-absorbing device illustrated in FIGURE 30 consists of the conduit 30, which is filled with a liquid $f$, at a pressure indicated as $P_x$, where $P_x$ may take any pressure the structure can contain without breaking. The bellows 112 serves as a Helmholtz oscillator and, as shown in the figures, separates the fluid $f$ in the bellows chamber 130 from the fluid $f'$ in the chambers 131, 132. Chamber 131 is formed by the bellows 112 and the housing 120 surrounding said bellows. Chamber 132 is formed by the separating liquid 133 and the housing 134, which contains said liquid. The fluid $f$ in the chamber 132a can enter and leave the line 30 through the small opening 129 in the conduit 121. The fluid $f'$ can pass freely between the chambers 131 and 132 through the conduit 135.

When the pressure $P_x$ in the line 30 changes, the liquid will flow through the conduit 121 until the pressure of the fluid $f'$ is equal to the pressure $P_x$ (neglecting the difference of the level of the fluid in chambers 130 or 132). If fluid $f'$ is a gas, it will be compressed when $P_x$ increases, and consequently the volume of chambers 131, 132 will both be reduced. This reduction in volume will cause the bellows 112 to increase in volume and the enlarged resonator will be tuned for a different frequency.

When the pressure $P_x$ in the line 30 is decreased, the volume of the chambers 131, 132 will both become greater and the chamber 130 within the bellows 112 will become smaller, so that the resonator will be tuned for another frequency. When the opening 136 leading to the conduit 116 is of constant size, the exact frequency, for which the bellows chamber 130 is tuned, will depend upon its volume. When the fluid $f'$ is not soluble in the fluid $f$ the separating liquid 133 can be eliminated, since the only purpose of this liquid is to prevent the absorption of liquid $f'$ by the liquid $f$.

Figure 31:
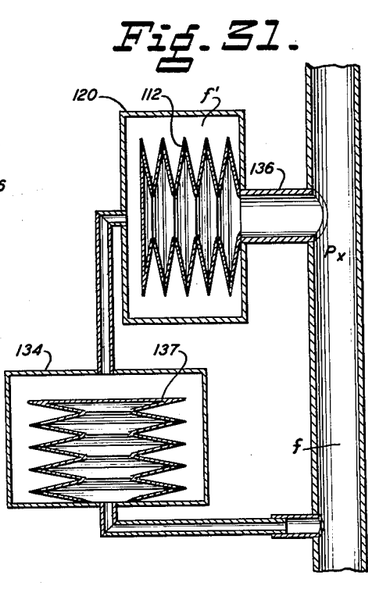
FIGURE 31 is a view similar to FIGURE 30, employing a plurality of bellows.

The device shown in FIGURE 31 is similar to that of FIGURE 30, except that a bellows 137 is used within the chamber 134. The bellows 137 hermetically seals the fluid $f'$ from the fluid $f$ in the conduit 30. When the pressure $P_x$ changes, both bellows 112 and 137 must change in length if the fluid $f'$ is a compressible fluid or a gas. By controlling the ratio between the areas of the two bellows 112, 137, and the volume within the two housings 120 and 134, a change in pressure $P_x$ can be used to control and change the volume of the bellows 112, and consequently can be used to tune the bellows 112 to a particular wave length. It will be apparent that this assembly can also be used as a surge chamber.

Figure 32:
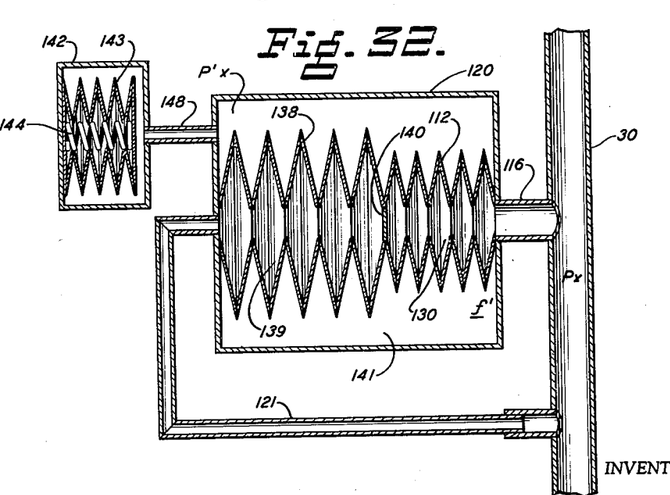
FIGURE 32 is a longitudinal sectional view of another form of self-tuning sound attenuating device, according to the present invention.

Referring to FIGURE 32, there is shown a sound absorbing resonator which employs a two-diameter bellows assembly for automatically tuning the resonator for changes in pressure. The bellows 112 is connected to the line 30 by a conduit 116, and has attached to the free end thereof a sealing plate 140. A second and larger diameter bellows 138 is attached at one end, to the sealing plate 140 and at its opposite end to the end wall of the housing 120. The housing 120 is further connected to the system by a conduit 121 which communicates with the fluid bearing line 30. The conduit 121 communicates with the interior of the large bellows 138, so that fluid may pass from the line 30 into the chamber 139 within the bellows 138. A chamber 141 is formed exterior of the bellows 138 between the outside surface of the bellows 138, 112, and the housing 120. This chamber 141 is coupled to a bellows 143, which is surrounded by a housing 142, by means of a small length of conduit 148. The conduit 148 communicates with the interior of the chamber 141, for a hereinafter described purpose.

When the pressure in the fluid line 30 equals the pressure $P'_x$ within the chamber 141, both bellows 112 and 138 will be at their free length. When $P_x$ increases and becomes greater than $P'_x$, the bellows 138, which has the greatest cross-sectional area, will expand and compress the smaller bellows 112. The volume of the chamber 130 will thereby become decreased and the bellows 112 will be tuned for the frequency which corresponds to the noise radiated by the line 30. Unless the fluid $f'$ within the chamber 141 is compressible, an expansion chamber which consists of the housing 142, the bellows 143 and a spring 144, must be added to the assembly. If the expansion chamber is not employed, the bellows chamber 139 can not increase in volume, and thereby reduce the size of the chamber 130.

When the pressure $P_x$ becomes less than $P'_x$, the volume of the chamber 130 will increase and the volume of the chamber 139 will decrease.

Figure 33:
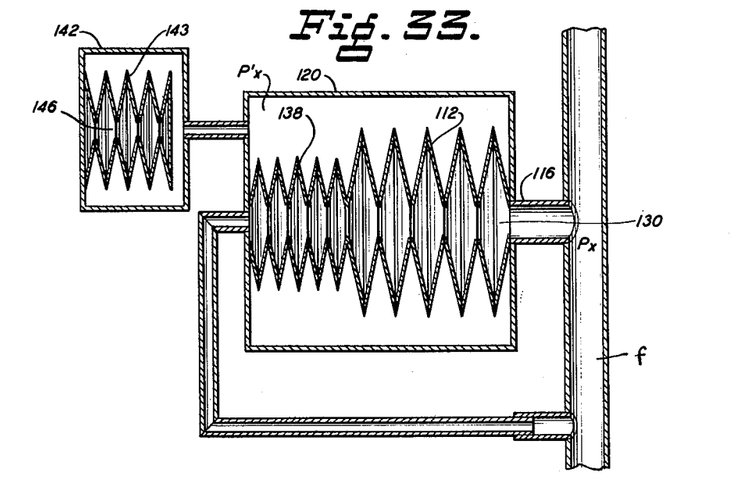
FIGURE 33 is a further embodiment of a self-tuning sound attenuating device, shown in longitudinal section.

The embodiment of the present invention shown in FIGURE 33 is similar to that of FIGURE 32, except that the bellows 112 is now formed with a larger effective area than that of bellows 138. The result of this construction is that as $P_x$ becomes greater than $P'_x$, the volume of chamber 130 will increase, and when $P_x$ becomes less than $P'_x$, the volume of the chamber 130 will decrease. It will be seen that, by changing the relative sizes of bellows 112 and 138, it is possible to cause the chamber 130 to either increase or decrease with an increase in pressure.

The expansion chamber 142 shown in FIGURE 33 is provided with a compressible fluid 146 therein, in lieu of the spring member 144. The embodiment shown in FIGURE 33 is opposite in action from that shown in FIGURE 32, since an increase in pressure $P_x$ will cause bellows 112 to increase in volume, while a decrease in pressure $P_x$ will cause bellows 112 to decrease in volume.

Figure 34:
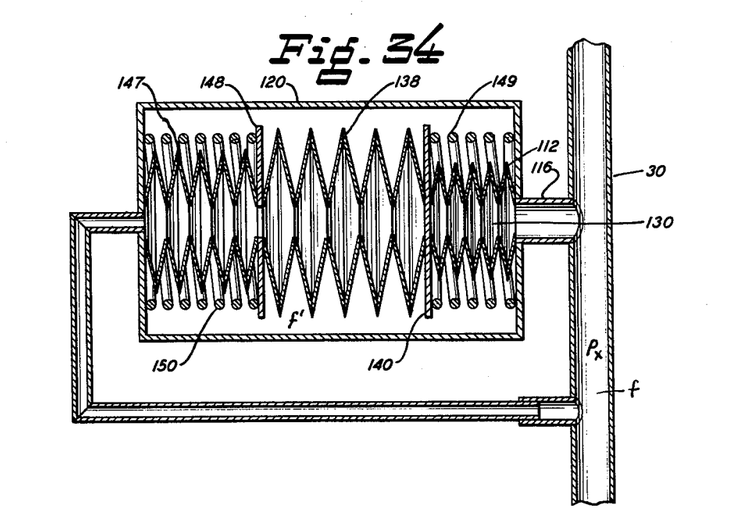
FIGURE 34 is a view in longitudinal section of a self-tuning sound attenuating device employing bellows and springs, made in accordance with the present invention.

The assembly illustrated in FIGURE 34 employs three bellows carried within the housing 120. The first bellows 112 is connected at one end to the fluid bearing line 30 by the conduit 116. A sealing plate 140 is secured to the free end of the bellows 112 and overlies it. The bellows 138, which is of a larger piston area than that of 112, is secured to the opposite face of the sealing plate 140, and extends therefrom. The opposite end of the bellows 138 is secured to a washer-shaped member 148, which is carried within the housing 120 by the bellows 138. A third and final bellows 147 is connected at one end to the ring 148 and at its opposite end to the end wall of the housing 120. The effective area of the third bellows 147 is less than that of the bellows 138, but greater than that of bellows 112. The bellows 138 will be free to move within the housing 120 in response to pressure applied thereto.

Spring members 149, 150 are interposed between the sealing plate 140 and housing end wall, and the ring 148 and the opposite housing end wall 120, respectively. The spring members 149, 150 modify the rate of increase of the bellows chambers within the bellows, as fluid under various pressures is applied thereto.

The assembly illustrated in FIGURE 34 has particular application to installations which must operate over a great range in temperatures and pressures. The exact manner in which the chamber 130 within the bellows 112 will change with pressures and temperatures will depend upon the relative effective areas of the bellows 112, 138 and 147.

When the pressure $P_x$ within the line 30 is increased, bellows 138 which has the greatest piston area, will increase and the rate of increase will depend upon the relative effective areas of the three bellows 112, 138, 147, and the two springs 149, 150. The springs 149, 150 will be selected as to strength so that they will compensate for the difference in effective area of the bellows. Thus, if the effective area of the bellows differs only in a small degree from one another, while at the same time maintaining the relationship hereinabove set forth, namely, that bellows 147 is greater than bellows 112, and bellows 138 is greater than bellows 147, the springs may be very weak. Unless the fluid $f'$ within the chamber 120 and surrounding the bellows is non-compressible, the pressure differential across the bellows will be very small. With the construction shown in FIGURE 34, it is thus possible to use three low-pressure bellows for this purpose.

When the temperature in the line increases the fluid $f'$ will expand, and with the bellows arrangement shown in FIGURE 34, the volume of the chamber 130 will increase.

All of the movements which accompany changes in pressure and temperature can, of course, be reversed by changing the relative effective areas of the bellows 112, 138 and 147. In this manner, the chamber 130 can be made to either increase or decrease in volume with an increase in temperatrue and pressure.

It is also possible by a suitable selection of effective areas for the three bellows, to incorporate within the stiffness of the bellows, the spring action of the springs 149, 150.

Having thus fully described the invention, what is claimed as new and sought to be secured by Letters Patent of the United States is:

1. A sound attenuator for incorporation into a fluid bearing line comprising, a first tubular section, a second tubular section in substantial alignment with and spaced from said first tubular section so as to provide a through flow path, resilient bellows means comprising a plurality of plates secured together by an elastomer, said resilient bellows means being secured at one end thereof to said first tubular section and at its other end to said second tubular section, said resilient bellows forming a resonant chamber disposed between said first and second tubular sections, and means externally disposed relative to said bellows for adjusting the bellows and thereby varying the size of the resonant chamber so as to tune the attenuator to sound traversing the fluid bearing line.

2. A structure as defined in claim 1 wherein said external means for adjusting the bellows comprises support means fixedly secured to both tubular sections and adjusting means disposed between the said support means and connected thereto.

References Cited in the file of this patent

UNITED STATES PATENTS

| | | |
|---|---|---|
| 781,939 | Fulton | Feb. 7, 1905 |
| 2,022,029 | Diehl | Nov. 26, 1935 |
| 2,031,451 | Austin | Feb. 18, 1936 |
| 2,157,029 | Starkweather et al. | May 2, 1939 |
| 2,185,023 | Crane | Dec. 26, 1939 |
| 2,233,804 | Bourne | Mar. 4, 1941 |
| 2,253,310 | Smellie | Aug. 19, 1941 |
| 2,341,556 | Joy | Feb. 15, 1944 |
| 2,682,312 | Hopkins | June 29, 1954 |
| 2,682,893 | Ziebold | July 6, 1954 |
| 2,765,044 | Hatte | Oct. 2, 1956 |
| 2,841,237 | Slayter | July 1, 1958 |